United States Patent [19]

Schoenfeld

[11] 4,208,044
[45] Jun. 17, 1980

[54] UNIVERSAL SPRING STABILIZER

[76] Inventor: Herbert Schoenfeld, 816 Pardee La., Wyncote, Pa. 19095

[21] Appl. No.: 932,423

[22] Filed: Aug. 10, 1978

[51] Int. Cl.² ............................................... F16F 1/26
[52] U.S. Cl. .................................................... 267/48
[58] Field of Search ....................... 267/45, 48, 52, 53

[56] References Cited

U.S. PATENT DOCUMENTS

| | | | |
|---|---|---|---|
| 2,884,241 | 4/1959 | Farchmin | 267/48 |
| 3,039,759 | 6/1962 | Paller | 267/48 |

Primary Examiner—Duane A. Reger
Attorney, Agent, or Firm—Weiser, Stapler & Spivak

[57] ABSTRACT

The universal spring stabilizer of the present invention includes a unitary spring stabilizer which is universally adaptable for use with most passenger car multi-leaf type rear springs. The spring stabilizer includes integral mounting constructions which facilitate securing the stabilizer to the car spring. The universal spring stabilizer acts to add a leaf to the rear spring and by virtue of its design, functions in a manner to work against the arch of the spring. The length of spring steel of which the stabilizer is fabricated is bent to overfit the spring suspension and includes front and rear riveted cross plates which function with U-bolt connections to secure the stabilizer to the passenger car rear spring. The stabilizer is formed front and rear with two spaced pressure points to apply the effects of the stabilizer to the existing spring at four spaced pressure points, two forwardly of the axle suspension and two rearwardly of the axle suspension.

8 Claims, 2 Drawing Figures

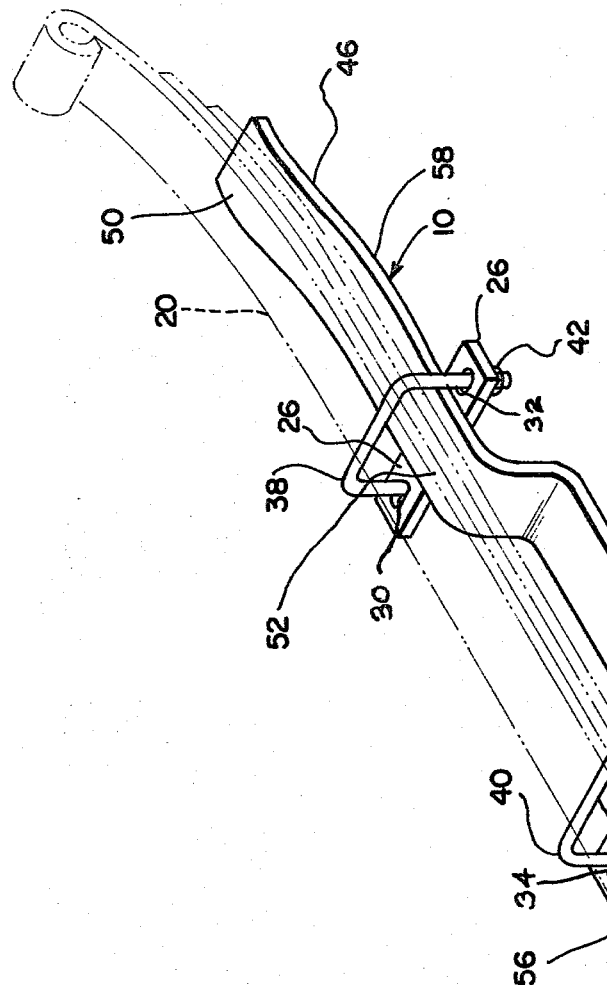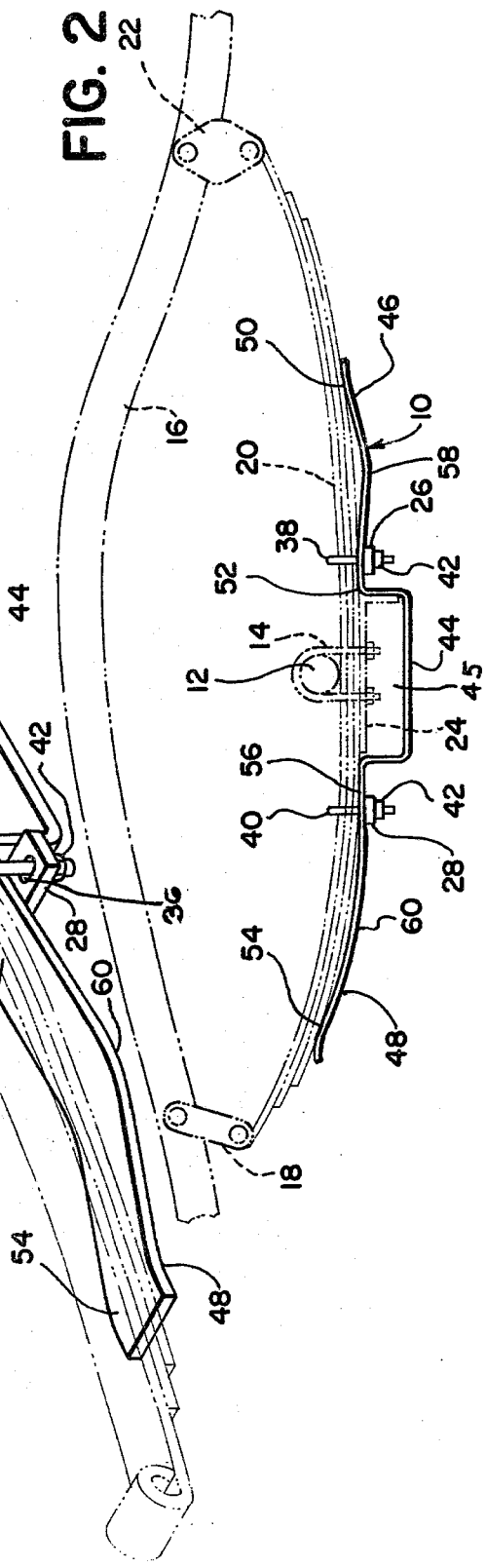

UNIVERSAL SPRING STABILIZER

BACKGROUND OF THE INVENTION

The present invention relates generally to automobile spring suspensions and more particularly is adapted to a universal stabilizer suitable for attachment to most passenger car rear suspension springs.

It is the usual practice to isolate the rear axle of an automobile from the frame of the vehicle by supporting the axle in a multi-leaf type spring which is suspended between a forward bearing bracket and a rearward spring shackle whereby most imperfections in the road surface can be absorbed by the wheel and the spring construction and not transmitted to the automobile passenger compartment through the frame. The multi-leaf type of spring is characterized by a plurality of stacked leafs, usually four or five in number which decrease in length away from the base or mounting leaf in the form of a truncated triangular configuration. The axle suspension connects to the thickest or highest part of the multi-leaf spring to achieve maximum support.

Occasionally, when a vehicle was utilized to carry especially heavy loads, the existing springs had a tendency to sag, or to flex sufficiently to permit "bottoming." Also, upon unusual wear or unusual surface conditions, the existing springs could allow "forward pitch" or "nose dive" of the vehicle, all to the discomfort of the passengers.

In order to bolster overload or sagging springs, prior workers in the art have developed stabilizer constructions for connection to the existing springs. Such stabilizers normally could not be designed as full length equipment inasmuch as installation usually was not possible without disturbing the existing suspension. Because of this inability to provide a single stabilizer suitable for use with the most commonly employed passenger car spring suspension systems, most prior workers in the art developed individual, separate, front and rear stabilizers which were designed to connect to the multi-leaf spring both forwardly of the axle and rearwardly of the axle in two separate, discrete stabilizer systems.

Because, the prior shock absorber or axle mountings usually included various fastening constructions affixed to the bottom of the leaf spring such as by spring clips, a single, universal, stabilizer of wide usage with most automobiles could not be developed due to the varying configurations. In the past several years, the shock mounting of most passenger cars has changed and the longest or base leaf of the spring is usually unencumbered. The present invention is fully adaptable for use with such modern suspension systems and provides adequate clearance for existing U-bolts and shock brackets and can be readily secured to stabilize the passenger car multi-leaf spring system without disturbing the existing suspension.

SUMMARY OF THE INVENTION

The present invention relates generally to a universal spring stabilizer and more particularly is directed to a unitary, advantageously bent, leaf spring of full length suitable to act simultaneously on the front and rear sections of existing multi-leaf type passenger car springs.

The universal spring stabilizer of the present invention is fabricated of heat treated alloy steel similar to that presently used to fabricate the existing multi-leaf type of passenger car spring. Front and rear cross plates are riveted or otherwise secured to the spring stabilizer and are provided with openings to receive the ends of U-bolts therethrough to permit easy installation without disturbing the existing suspension.

The spring stabilizer comprises a central or medial recess of suitable width and depth to provide adequate clearance for existing suspension constructions such as axle U-bolts, shock brackets and the like. A forward stabilizer segment integrally extends forwardly of the medial recess and is bent to provide a pair of spaced fulcrums or pressure points whereby the bias of the spring stabilizer is brought to bear against the existing multi-leaf spring in two forward spaced locations. The design of the present universal spring stabilizer renders it compatible for use with most passenger car suspension systems without extensive alterations.

As used herein, the term "full length" means a unitary stabilizer of design to cover part of the multi-leaf spring forward of the axle and to cover part of the multi-leaf spring rearward of the axle.

Similarly, a rear stabilizer segment integrally extends rearwardly from the medial recess and is bent to form a pair of spaced fulcrums or pressure points which bear against the rear portion of the existing multi-leaf spring system. The front and rear cross plates are utilized with suitable U-bolt connectors of known type to securely affix the spring stabilizer to the multi-leaf spring in a manner to clear existing shock brackets and axle mounts and to bear against the multi-leaf spring in two forward, spaced locations and two rearward, spaced locations.

After the spring stabilizer is intalled on each of the automobile rear multi-leaf springs, noticeable increase in load capacity can be observed inasmuch as the spring stabilizer acts to restore the true arc to sagging springs. The device provides greater stability on curves by preventing cornering, eliminates bottoming, forward pitch and nose dives and assures safe, smooth, straight driving even with overloads. The addition of the spring stabilizer of the present invention to an existing, overloaded, passenger car multi-leaf spring system will additionally act to end rear end sag which is common occurrence under such circumstances.

It is therefore an object of the present invention to provide an improved spring stabilizer of the type set forth.

It is another object of the present invention to provide a novel universal spring stabilizer that is unitary in construction and which is full length in design.

It is another object of the present invention to provide a novel universal spring stabilizer which comprises a medial recess to provide adequate clearance for existing U-bolts, shock brackets and the like and which may be easily installed without disturbing existing suspension constructions.

It is another object of the present invention to provide a novel universal spring stabilizer that is universally adaptable for use with a majority of passenger automobile, multi-leaf spring suspension systems presently in use.

It is another object of the present invention to provide a novel universal spring stabilizer comprising a medial recess and an integral, forwardly extending, forward spring segment and an integral, rearwardly extending, rear spring segment whereby a multi-leaf spring can be forwardly and rearwardly supported by a single stabilizer.

It is another object of the present invention to provide a novel universal spring stabilizer of full length suitable to simultaneously act on both the front and the rear of existing springs and which is provided with front and rear cross plates permanently affixed in position for positive lock.

It is another object of the present invention to provide a novel universal spring stabilizer that is bent from a single length of spring steel to provide a medial recessed area, a forward, integral, spring segment bent to provide two spaced bearing points and a rearward integral spring segment also bent to provide a pair of spaced bearing points.

It is another object of the present invention to provide a novel universal spring stabilizer that is rugged in construction, inexpensive in manufacture and trouble free when in use.

Other objects and a fuller understanding of the invention will be had by referring to the following description and claims of a preferred embodiment thereof, taken in conjunction with the accompanying drawings, wherein like reference characters refer to similar parts through the several views and in which:

BRIEF DESCRIPTION OF THE DRAWINGS

FIG. 1 is a perspective view of the universal spring stabilizer with a multi-leaf type spring shown in phantom lines for purposes of association.

FIG. 2 is a side elevational view of the universal spring stabilizer of FIG. 1, on reduced scale.

DESCRIPTION OF THE PREFERRED EMBODIMENTS OF THE INVENTION

Although specific terms are used in the following description of the sake of clarity, these terms are intended to refer only to the particular structure of the invention selected for illustration in the drawings and are not intended to define or limit the scope of the invention.

Referring now to the drawings, there is illustrated in FIGS. 1 and 2 a universal spring stabilizer designated 10 which is affixed to a conventional multi-leaf spring 20 of the type usually employed for passenger automobile suspension systems. In conventional manner, the multi-leaf spring 20 is affixed to the automobile frame 16 by a forward bearing bracket 22 and a rearward spring shackle 18 to provide spring suspension for the usual rear axle 12. As illustrated, the rear axle 12 is secured to the multi-leaf spring 20 by one or more spring clips or U-bolts 14. The U-bolts 14 secure through the spring bracket 24 at a location that is substantially midway between the bearing bracket 22 and the spring shackle 18.

As shown in the drawings, the universal spring stabilizer of the present invention is formed of a unitary length of spring alloy steel and is suitably bent with usual steel bending equipment to form a forward section 46, a rearward section 48 and an integral medial section 44. After bending to the desired shape, the spring stabilizer may be suitably heat treated in known manner to provide the necessary qualities of toughness, strength and durability.

The medial section or segment 44 is generally U-shaped in configuration and is bent downwardy from the forward and rearward sections 46, 48 to provide sufficient clearance space 45 to overfit the U-bolt fasteners 14, spring brackets 24, shock mounts (not shown) and other constructions which may be similarly positioned without contact and without requiring the disturbance of existing suspension systems. The clearance space 45 should be designed of sufficient width and depth to render the device 10 suitable for use with most popular passenger car spring suspension designs. In this manner, a single unit 10 can be employed for application in universal manner with most existing automobile suspensions.

Front and rear cross plates 26, 28 or forward and rearward attaching means are affixed respectively to the forward section or segment 46 and to the rearward section or segment 48 for stabilizer attachment purposes. The cross plates 26, 28 may be riveted, welded or otherwise permanently secured in place immediately forwardly and rearwardly of the medial section or segment 44. The forward cross brace 26 is provided with spaced attaching holes 30, 32 to receive therethrough the front U-bolt 38 in manner to securely affix the forward segment 46 to the automobile spring 20. Similarly, the rearward cross brace 28 is provided with a pair of spaced attaching holes 34, 36 to receive therethrough the rear U-bolt 40 to securely affix the rearward segment 48 to the automobile spring 20. In the preferred embodiment, the cross plates 26, 28 are fastened at right angles to the axis of the spring stabilizer 10.

As best seen in FIG. 2 and as can be observed in FIG. 1, the forward spring segment 46 is bent or otherwise formed to provide a front arch means or front arch 58. The front arch 58 extends forwardly from the medial segment 44 and is defined between a front pressure point 50 and a rear pressure point 52. The rearward spring segment 48 is bent or otherwise formed to provide a rear arch means or rear arch 60. The rear arch 60 extends rearwardly from the medial segment 44 and is defined between a forward pressure point 56 and a rear pressure point 54.

In order to use the spring stabilizer 10 of the present invention, the front and rear U-bolts 38, 40 are applied with their respective web portions over the multi-leaf spring 20 and with their leg portions inserted respectively through the cross plate openings 30, 32 and 34, 36. Nuts 42 are tightened to the threaded ends of the U-bolt legs in conventional manner to secure the parts together. After the nuts 42 are fully turned, the spring stabilizer 10 will be securely affixed to the multi-leaf spring 20 with the clearance space 45 defined by the medial segment 44 providing adequate clearance for existing U-bolts 14, shock brackets, spring brackets 24, etc., without requiring any alterations. In this manner, the spring stabilizer 10 is applied directly to the multi-leaf spring 20 in a manner to add an additional leaf to the spring 20.

The tightened U-bolts 38, 40 pull the spring stabilizer 10 tightly against the multi-leaf spring 20 with the front pressure points 50, 52 and the rear pressure points 54, 56 applying direct forces against the spring 20 in two forward, spaced locations and two rearward, spaced locations. As illustrated best in FIG. 2, the stabilizing forces generated by the spring stabilizer 10 work against the arch of the multi-leaf spring 20 in a manner to increase load capacity by raising fatigued springs as well as by supplementing good springs. The spring stabilizer 10, after application acts directly to improve the riding qualities of the vehicle (not shown) by eliminating bottoming, forward pitch and nose dive. The device 10 also provides greater stability on curves by preventing cornering. In addition, the spring stabilizer assures safe, smooth, straight driving, even with overload. Rear sag can be eliminated upon proper application of the present spring stabilizer.

Although the present invention has been described with reference to the particular embodiments herein set forth, it is understood that the present disclosure has been made only by way of example and that numerous changes in the details of construction may be resorted to without departing from the spirit and scope of the invention. Thus, the scope of the invention should not be limited by the foregoing specification, but rather only by the scope of the claims appended hereto.

What is claimed is:

1. In a spring stabilizer designed to stabilize a multi-leaf type automobile spring of the type including a medial axle mounting means, the combination of
   a unitary length of spring material adapted to be applied directly against the multi-leaf spring forwardly and rearwardly of the axle mounting means,
   said length of spring material being configured to form a medial segment, a forward segment extending forwardly from the medial segment and a rearward segment extending rearwardly from the medial segment,
   the medial segment defining a clearance space between the spring stabilizer and the axle mounting means;
   forward attaching means secured intermediate the medial segment and the forward segment for attaching the forward segment to the multi-leaf spring;
   rearward attaching means secured intermediate the medial segment and the rearward segment for attaching the rearward segment to the multi-leaf spring; and
   front and rear arch means formed respectively in the forward and rearward segments to apply spring stabilizer forces against the underside of the multi-leaf spring in a plurality of spaced locations forwardly of the axle mounting means and in a plurality of spaced locations rearwardly of the axle mounting means, the spring stabilizer being adapted not to contact the axle mounting means.

2. The spring stabilizer of claim 1 wherein the forward attaching means is adapted to be permanently affixed to the spring stabilizer.

3. The spring stabilizer of claim 1 or 2 wherein the rearward attaching means is adapted to be permanently affixed to the spring stabilizer.

4. The spring stabilizer of claim 1 wherein the forward attaching means comprises a front cross brace permanently affixed to the spring stabilizer, the front cross brace extending transversely outwardly from the forward segment.

5. The spring stabilizer of claim 4 wherein the front cross brace is positioned at right angles to the axis of the stabilizer and wherein the front cross brace is provided with a pair of transversely spaced attaching openings.

6. The spring stabilizer of claim 1 wherein the front arch means define a first front pressure point and a first rear pressure point, said first front and rear pressure points being adapted to contact the multi-leaf spring to apply stabilizer pressure at two forward, spaced locations forwardly of the axle mounting means.

7. The spring stabilizer of claim 1 or 6 wherein the rear arch means define a second front pressure point and a second rear pressure point, said second front and rear pressure points being adapted to contact the multi-leaf spring to apply stabilizer pressure at two rearward, spaced locations rearwardly of the axle mounting means.

8. The spring stabilizer of claim 5 wherein the forward attaching means further comprises a U-bolt having a web and a pair of legs, the web being positioned over the multi-leaf spring and the legs being secured through the attaching openings to secure the stabilizer to the multi-leaf spring forwardly of the axle mounting means.

* * * * *